United States Patent [19]

Hach

[11] 3,849,002

[45] Nov. 19, 1974

[54] METHOD AND APPARATUS FOR ELIMINATING AIR DURING FLUID TURBIDITY MEASUREMENT

[75] Inventor: Clifford C. Hach, Ames, Iowa

[73] Assignee: Hach Chemical Company, Ames, Iowa

[22] Filed: May 11, 1973

[21] Appl. No.: 359,446

[52] U.S. Cl. .................. 356/103, 356/208, 356/246
[51] Int. Cl. ......................... G01n 21/00, G01n 1/10
[58] Field of Search ..................... 356/103, 208, 246

[56] References Cited
UNITED STATES PATENTS 3,306,157  2/1967  Hach .................................. 356/208
3,560,099  2/1971  Boe et al. .............................. 356/246

Primary Examiner—Vincent P. McGraw
Attorney, Agent, or Firm—Wolfe, Hubbard, Leydig, Voit & Osann, Ltd.

[57] ABSTRACT

Method and apparatus for eliminating air in fluid samples continuously flowing through a closed turbidimeter instrument wherein the fluid flowed at a predetermined rate is directed through an air trap zone isolated from the turbidity sensing zone, a fluid is maintained in the air trap zone by means of the flow rate for a sufficient time period and through an elongated path to remove air bubbles present in the fluid.

6 Claims, 2 Drawing Figures

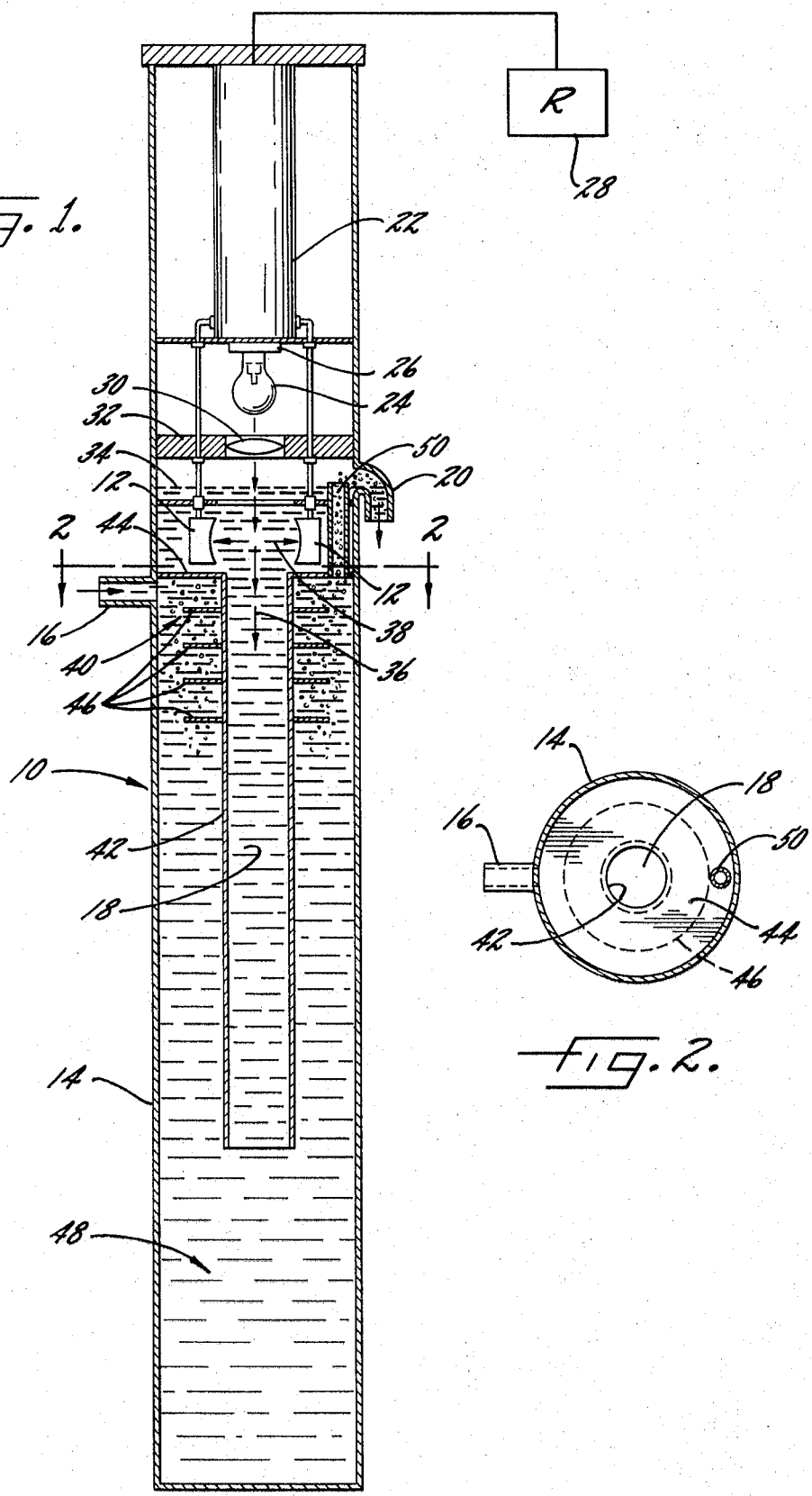

METHOD AND APPARATUS FOR ELIMINATING AIR DURING FLUID TURBIDITY MEASUREMENT

BACKGROUND OF THE INVENTION

The invention relates generally to methods and apparatus for measuring the turbidity of fluids, known as turbidimeters, and concerns more particularly a method and apparatus for eliminating any influence of air from turbidity measurements in photoelectric turbidimeters for testing continuously flowing fluid samples.

Turbidity is an expression of the optical property of a fluid sample which causes light to be scattered and absorbed rather than passing in straight lines through the sample and it is a commonly accepted criterion for, by way of example, the quality of treated water. Turbidity is caused by the presence of suspended matter or particles in fluids and as such may be sensed by the instruments known as turbidimeters which measure turbidity in terms of light reflected from a light beam introduced into the fluid by employing a sensing device such as a photocell to measure either the amount of light allowed to pass through the fluid or the amount of light reflected from the particles in the fluid.

The sensitivity of photoelectrical turbidimeters is quite high so that when testing continuously flowing fluid samples the presence of air bubbles in the fluid can cause a false or phantom reading by the instruments. Entrained air which may occur due to the pumping or flow systems that carry the fluid into the turbidimeter heretofore has been a considerable problem in its effect upon readings obtained.

Accordingly, it is a primary aim of the present invention to provide a method and apparatus for eliminating entrained air in fluid samples continuously flowing through closed turbidimeter instruments.

A more specific object of the present invention is to provide an improved air elimination arrangement adapted for utilization in connection with a continuous flow turbidimeter in which air bubbles present in the fluid entering the instrument are substantially removed before fluid turbidity is sensed photoelectrically so that measurements taken by the instrument are not affected by the presence of such suspended air bubbles.

It is another object to provide a method and apparatus for eliminating air in turbidity instruments which is simple and economical for producing more reliable and accurate results with such instruments.

Other objects and advantages of the invention will become apparent upon reading the following detailed description and upon reference to the drawings.

BRIEF DESCRIPTION OF THE DRAWINGS

FIG. 1 is a vertical section of an exemplary turbidimeter constructed in accordance with the present invention and employing the method of the invention;

FIG. 2 is a section taken approximately along the line 2—2 in FIG. 1.

DESCRIPTION OF THE PREFERRED EMBODIMENT

While the invention will be described in connection with a certain preferred embodiment and procedure it will be understood that I do not intend to limit the invention to the particular embodiment or procedure. On the contrary, I intend to cover all alternatives, modifications and equivalents as may be included within the spirit and scope of the appended claims.

Referring now to FIG. 1, there is shown an illustrative turbidimeter embodying the invention and arranged to eliminate air bubbles in the supply of fluid introduced to the instrument prior to measurement of the turbidity in accordance with the invention. For details of turbidimeter instruments of the type to which the present invention is concerned, reference is made to C. C. Hach U.S. Pat. Nos. 3,306,157; 3,309,956; 3,528,750 and 3,564,262, all assigned to the assignee of the present invention.

Briefly, the turbidimeter 10 is of the photoelectric type in which the turbidity of the fluid is tested by passing a beam light into a fluid sample and measuring the effect of the light beam in terms of light energy striking photoelectric cells 12. The turbidimeter 10, as shown, includes an elongated container 14 having an inlet conduit 16 through which a supply of fluid is continuously introduced maintaining a vertical column 18 of fluid to be tested. For the purpose of allowing the fluid to freely drain from the container, there is provided an upper drain opening 20 positioned vertically above the inlet conduit 16.

Supported at the top of the container 14, which in the preferred embodiment is tubular in form, there is an enclosed electrical head assembly 22 that may contain a suitable power supply (not shown) for a light source such as a precision, constant intensity lamp 24 shown supported by a bracket 26 above the fluid column 18. Due to the fact that the output of the turbidimeter is electrical, a recording instrument 28 which may be a galvanometer, a continuous recorder or other electrically energized instrument well known to those skilled in the art is provided to receive the output and transform it into a desired useful state.

In order to direct the beam of light down through the fluid sample, there is provided a focusing lens 30 supported by a bracket 32 between the lamp 24 and the upper surface 34 of fluid column 18.

Photoelectric cells 12 are suspended in an annular array within the water column 18, but out of the direct path of the light beam as represented by the rays 36 directed down the center of the column.

In operation, the light beam as represented by the rays 36 passing down through the fluid column 18 are partially reflected in a certain proportion as illustrated by rays 38 by turbidity particles suspended in the fluid. The greater the number of particles present, the more turbid the fluid and thus the more light energy reflected. Consequently, the electrical output of the photoelectric cells 12 is directly dependent upon the reflected light or turbidity of the fluid in the column 18.

In accordance with the present invention, the container 14 is constructed with an air-trap zone being provided therein which allows for trapping and bleeding off air from fluid passing into the container at inlet conduit 16. More specifically, the air trap zone 40 is defined by a centrally disposed cylindrical member 42 which extends downwardly a substantial distance of the length of the container 14. At the upper end of the cylinder 14, an annular flange 44 extends to the inner peripheral wall of the container 14 to close off the air-trap zone from the central fluid column 18.

In order to reduce fluid pressure which assists in releasing air from the flowing fluid and also to aid in the stripping of air from the fluid by surface contact, there is provided a plurality of spaced annular baffles 46 radially projecting outward from the cylinder 42. Consequently, any air present in the fluid flowing into the air trap zone 40 bubbles up through the fluid to the top of the air trap zone 40 as the fluid enters and as it moves past the baffles 46 toward the bottom 48 of the container 14.

For permitting the escape of the removed air, there is provided a vent conduit 50 connected to the closure flange 44 with the vent conduit extending above the water level 34 to allow the free air passage out of the drain 20.

In order to insure that a maximum amount of air is removed from the fluid to be tested prior to its movement into the measuring zone adjacent the photoelectric cells 12 in accordance with the method of the invention, the flow rate is maintained fairly slow to give the fluid ample time in the air trap zone 40 with the fluid reaching a fairly quiescent flow state in the lower zone 48 of the container and as it flows up through the central fluid column 18 before exiting through drain 20. Thus, the fluid entering the container 14 is maintained at a prolonged period in the air trap zone away from the turbidity detecting or measuring zone and then it is flowed through an elongated path which permits a more quiescent flow of the fluid to set in before the turbidity testing takes place.

I claim as my invention:

1. In a turbidimeter for sensing the turbidity of a continuously flowing fluid sample including a container for supporting a vertical column of fluid to be tested, means defining a drain opening in said container for establishing an upper surface on said fluid column whereby the fluid may drain from the column at the level of said upper surface, inlet means for transmitting a continuous flow of fluid to said column, a light source fixed relative to said container for directing a beam of light down into said fluid column, means including photoelectric cells surrounding said light beam and being disposed facing the beam passing through the fluid column to define a measuring zone, the electrical output of said cells being dependent upon the amount of light energy from said light beam that is reflected toward the photoelectric cells by particles suspended in said fluid, the improvement comprising, an air trap zone disposed between the inner wall of the container and the central portion of the fluid column through which said light beam passes, said air trap zone being in communication with the inlet means transmitting said fluid flow to the column, vent means connecting said air trap zone to said drain outlet, and said air trap means extending downwardly a substantial distance along the length of said container so that fluid flowing through said air trap zone is present a sufficient length of time to eliminate air and reach a quiescent state prior to flowing up through the central column to the measuring zone and departure of said fluid through said drain.

2. The turbidimeter as claimed in claim 1 wherein said air trap means comprises a cylindrical member having a radial flange at its upper end extending to the inner peripheral wall of said container and a plurality of spaced annular baffles surrounding and projecting from said cylindrical member.

3. The turbidimeter as claimed in claim 2 wherein said photoelectric cells are disposed beneath the surface of said fluid and above said flange end of said cylindrical member.

4. A turbidimeter as claimed in claim 2 wherein said vent means comprises a conduit connected to said flange end of the tubular means and said conduit extends above the surface of the fluid column.

5. A method of sensing the turbidity of a fluid sample in a turbidimeter having a chamber including inlet and outlet means and a sensing zone including means for measuring light energy reflected from a beam of light passed through a fluid column in said chamber comprising the steps of, (a) flowing the fluid continuously to the turbidimeter inlet at a predetermined rate, (b) directing said fluid flow through an air trap zone isolated from said sensing zone, (c) maintaining said fluid in the air trap zone by means of said flow rate for a sufficient time period to remove air bubbles present in said fluid and (d) directing said fluid free of entrained air through an elongated path sufficient to reach a quiescent flow of said fluid to the sensing zone for the turbidity test prior to exiting of said fluid through the outlet.

6. A method as claimed in claim 5 including venting said air trap zone and passing said removed air to the outlet.

* * * * *